(12) United States Patent
Watroba et al.

(10) Patent No.: US 8,850,245 B2
(45) Date of Patent: Sep. 30, 2014

(54) METHOD FOR OPERATING A BUS SYSTEM

(75) Inventors: Radoslaw Watroba, Dachau (DE);
Rainer Kraly, Dortmund (DE);
Christian Schmitz, Dortmund (DE)

(73) Assignee: ELMOS Semiconductor AG, Dortmund (DE)

( * ) Notice: Subject to any disclaimer, the term of this patent is extended or adjusted under 35 U.S.C. 154(b) by 265 days.

(21) Appl. No.: 13/219,748

(22) Filed: Aug. 29, 2011

(65) Prior Publication Data

US 2012/0054406 A1 Mar. 1, 2012

(30) Foreign Application Priority Data

Aug. 27, 2010 (EP) ...................................... 10174301

(51) Int. Cl.
*G06F 1/26* (2006.01)
*H04L 12/40* (2006.01)

(52) U.S. Cl.
CPC . *H04L 12/40039* (2013.01); *H04L 2012/40215* (2013.01)
USPC .......................................... 713/320; 713/324

(58) Field of Classification Search
CPC ..................................... G06F 1/26; G06F 1/30
USPC .................................................. 713/300–340
See application file for complete search history.

(56) References Cited

U.S. PATENT DOCUMENTS

| | | | | |
|---|---|---|---|---|
| 6,484,082 B1 * | 11/2002 | Millsap et al. | ................... | 701/48 |
| 6,728,892 B1 * | 4/2004 | Silvkoff et al. | ............... | 713/320 |
| 7,539,888 B2 * | 5/2009 | Hu et al. | ....................... | 713/324 |
| 7,890,229 B2 * | 2/2011 | Huebl | .............................. | 701/36 |
| 2005/0160301 A1 * | 7/2005 | Disser | ........................... | 713/310 |
| 2008/0276107 A1 * | 11/2008 | Bogavac | ...................... | 713/323 |

FOREIGN PATENT DOCUMENTS

| | | |
|---|---|---|
| DE | 198 09 726 A1 | 9/1999 |
| DE | 103 58 584 A1 | 7/2004 |
| EP | 0 870 648 B1 | 10/1998 |
| FR | 2 917 555 A3 | 12/2008 |
| WO | 03/104037 A1 | 12/2003 |
| WO | 2006/003540 A1 | 1/2006 |

OTHER PUBLICATIONS

BOSCH: "CAN Specification version 2.0"; XP002156917; 1991.

* cited by examiner

*Primary Examiner* — Raymond Phan
(74) *Attorney, Agent, or Firm* — Renner, Otto, Boisselle & Sklar, LLP

(57) ABSTRACT

A method for the switching of participants of a bus system from a first state with reduced energy consumption to a second state with increased energy consumption relative to the first state, wherein, for communication between the participants of the bus system, data frames are transmitted which comprise, inter alia, a message identification field (e.g. CAN message) and a useful-data field (e.g. CAN payload), wherein, according to said method, each participant, for switching from the first state to the second state, reacts on data frames with respectively predetermined data contents in the message identification field as well as in the useful-data field. Further, in the bus system, for selective switching of a participant from the first state to the second state, those data frames will be transmitted on whose message-identification-field contents and useful data-field-contents the selectively addressable participant reacts.

6 Claims, 2 Drawing Sheets

METHOD FOR OPERATING A BUS SYSTEM

BACKGROUND OF THE INVENTION

1. Field of the Invention

The present invention relates to a method for operating a bus system, and particularly a method for the switching of participants of a bus system from a first state with reduced energy consumption to a second state with increased energy consumption relative to the first state.

2. Description of the Prior Art

Manufacturer of automobiles are subjected to ever more restrictive demands to minimize the $CO_2$ emissions of automobiles. One approach for reduction of pollutant emission in vehicles resides in the introduction of partial communication networks in vehicles wherein those functions which are not required (i.e. control devices or bus participants) will be switched off and, when required, will be temporarily reactivated. This idea is not new and has been described e.g. in DE 198 09 726A1, DE 103 58 584 A1, EP 0 870 648 B1, WO 03/104037 A1 and WO 2006/003540 A1; up to now, however, the above approach still lacks technically implementable and commercially attractive realizations.

From FR 2 917 555 A3, there is known a method for the switching of participants of a bus system from a first state with reduced energy consumption to a second state with increased energy consumption relative to the first state, wherein, for communication between the participants of the bus system, data frames are transmitted which comprise, inter alia, a message identification field. In this method, each participant, for switching from the first state to the second state, will react on data frames with respective predetermined data contents in the message identification field, wherein, in the bus system, for selective switching of a participant from the first state to the second state, those data frames will be transmitted on whose message-identification-field contents the selectively addressable participant reacts.

In present-day solutions, the users are confronted with limitations in regard to those messages to be transmitted via the communication network which are available for temporary selective reactivation of the bus participants. An example of such limitations is the CAN bus according to BOSCH: "CAN Specification version 2.0", INTERNET CITATION, 1991, XP002156917. The messages available for the wakeup function are mostly "hard"-coded in the bus participants, notably in the form of a "pattern" on which a reaction will occur while, however, the wakeup reason/source cannot be identified. Disadvantageously, also introducing further discrete "patterns" would merely allow for rather modest improvements.

It is an object of the invention to provide a method for the switching of participants of a bus system from a first state with reduced energy consumption to a second state with increased energy consumption relative to the first state, wherein this method shall allow for larger flexibility and make it possible to use messages across and beyond the network.

SUMMARY OF THE INVENTION

For achieving the above object, there is proposed, in accordance with the invention, a method for the switching of participants of a bus system from a first state with reduced energy consumption to a second state with increased energy consumption relative to the first state, wherein, for communication between the participants of the bus system, data frames are transmitted which comprise, inter alia, a message identification field (e.g. CAN message) and a useful-data field (e.g. CAN payload), wherein, according to said method each participant, for switching from the first state to the second state, will react on data frames with respective predetermined data contents in the message identification field as well as in the useful-data field, and in the bus system, for selective switching of a participant from the first state to the second state, those data frames will be transmitted on whose message-identification-field contents and useful-data-field-contents the selectively addressable participant reacts.

According to the invention, it is provided that data contents both for the message identification field and for the useful-data field of a data frame are determined and analyzed in advance, and that, then, during a later transmission of these data frames in the bus system, the selectively addressable participants will react on said data contents, with the result that they will be switched from the first state to the second state. By this approach, the user can now freely configure his/her bus system so that the flexibility and the range of possible applications of the bus system are increased.

Thus, by use of the invention, it is rendered possible to switch the participants of a bus system from a state with lower energy demand to a state with higher energy demand in a selective manner and with the aid of random data frames which, beforehand, have been provided with predetermined data contents with regard to the message identification field and the useful-data field. Further, by use of the inventive method, groups (clusters) of bus participants can be formed which can be addressed and/or activated simultaneously by a single data frame. This can be performed selectively with the aid of useful-data-field contents (payload), and/or by masking the message identification fields.

Suitably, the method of the invention is applied particularly in a CAN bus system, with the CAN ID field being used as the message identification field and the CAN payload field being used as the useful-data field of a CAN data frame. However, the invention can also be used in other bus systems such as e.g. a LIN or FlexRay network.

Sometimes, it can be advantageous if a plurality of participants of the bus system are awakened by transmission of a (sole) data frame. Further, in certain applications, it is of advantage if various master participants of a bus system are able to awaken other bus participants. These variants are realized in that a plurality of participants of the bus system will react on the same predetermined data contents in the message identification field as well as on different, respectively predetermined data contents in the useful-data field, or on different, respectively predetermined data contents in the message identification field as well as on different, respectively predetermined data contents in the useful-data field, or on different, respectively predetermined data contents in the message identification field as well as on the same predetermined data contents in the useful-data field.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF PREFERRED EMBODIMENTS

Figure 1:
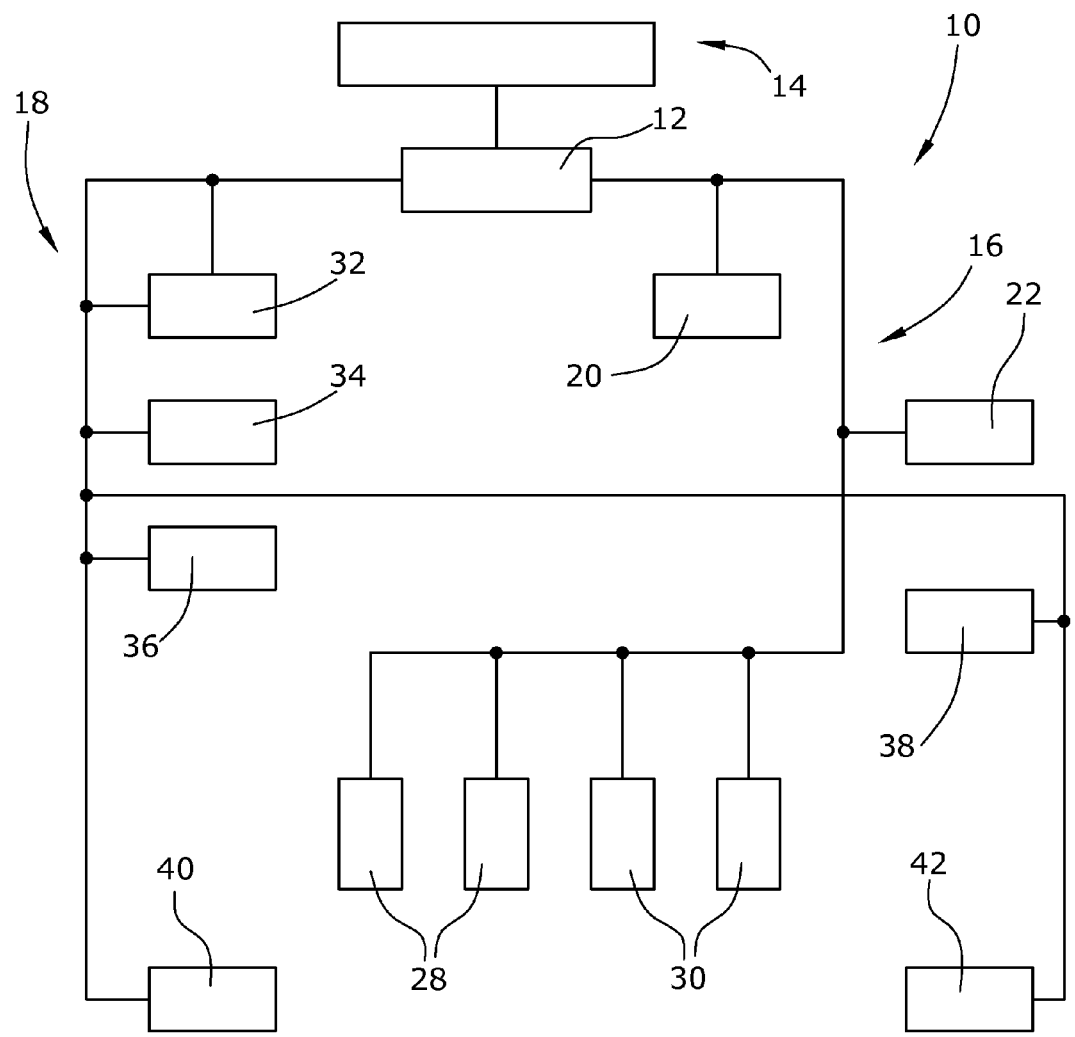
FIG. 1 is a schematic representation of an example of a CAN bus system in an automobile.

In FIG. 1, a part of a communication network 10 of an automobile is schematically represented, wherein the participants of said network can be selectively "awakened". Via a gateway 12, a plurality of CAN partial networks are connected to each other. Among these partial networks, there is e.g. a "drive CAN" 14 for the motor management, a "comfort CAN" 16 for the air condition system and seat adjustment, and a "combinatory CAN" 18 comprising the central locking system and, in this embodiment, the door control device.

In FIG. 1, said "drive CAN" 14 is not illustrated in greater detail. Said "comfort CAN" 16 includes, apart from an air conditioning control device 20 and various actuators—indicated by reference numeral 22—for aeration flaps, blowers and the heating aggregate, further participants 28,30 for seat adjustment, seat heating and, optionally, a seat ventilation system and a seat massage system.

Figure 2:
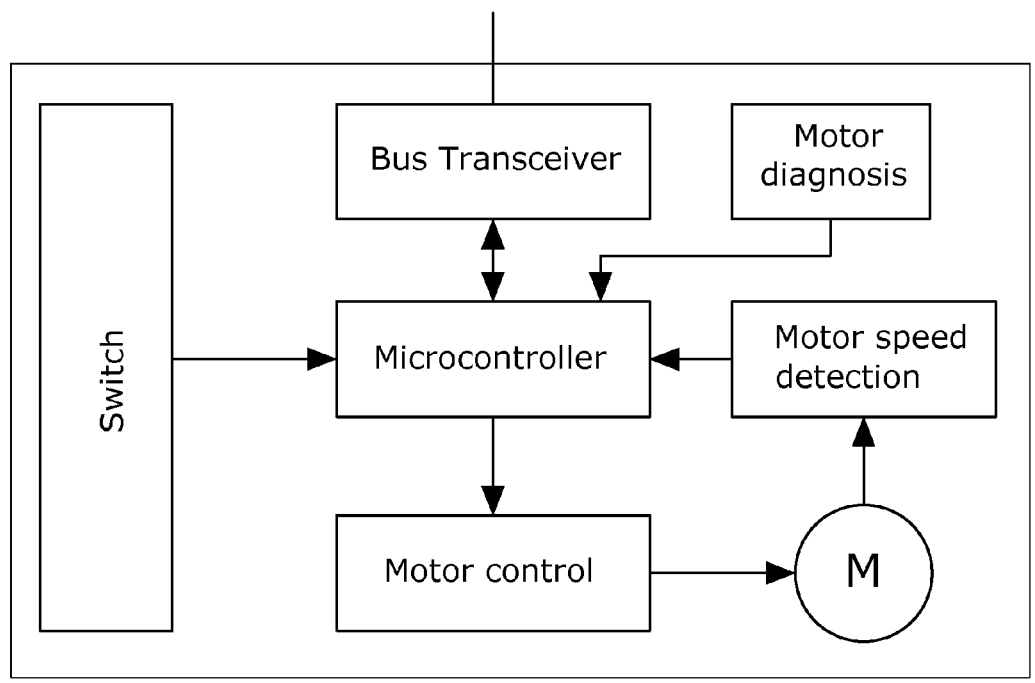
FIG. 2 is a schematic view of an exemplary layout of a window-lifter control device as used in the bus system according to FIG. 1.

Said "combinatory CAN" 18 can include the control device 32 for the central locking system and the door control device 34 as well as window-lifter control devices 36, 38, 40, 42 for four side windows. The configuration of such a window-lifter control device is schematically outlined in FIG. 2.

By the method of the invention, it is now possible to use the CAN ID and CAN payload fields to "awaken", in a well-aimed and selective manner, individual participants or also groups of participants of the bus system. In this regard, the possibility of free configurability has the beneficial effect of an increased flexibility on the side of the user. Across and beyond the network, i.e. for instance for the "drive CAN" 14, the "comfort CAN" 16, the "combinatory CAN" 18 as well as further CAN networks, it is possible to use only one CAN message without the need to translate said message for the respective partial networks with the aid of gateway 12. In addition thereto, already merely one CAN message should be sufficient to awaken all required control devices.

With the invention, there has been found a "downward compatible" method which is applicable by use of the conventional CAN PHY and CAN protocol and which offers maximum flexibility for the system design on the side of automobile manufacturers. The wakeup information is communicated with the aid of freely defined CAN IDs which, e.g., are not used at the present day. Optimum flexibility is accomplished since, according to the invention, also the CAN payload can be freely configured.

Using the method of the invention, it is further possible to activate, in dependence on the wakeup reason/source, different participants of the bus system within a group of participants. In this regard, it is to be considered that, in some applications, certain technical functions can be carried out only with the aid of a plurality of control devices (functional groups). As an example, reference be made to the process of opening one of the rear windows. For this purpose, specific parameters have to be polled in the network, e.g. the locking state of the automobile, the position of the ignition key, and the child-safety lock. The request for opening the rear window can have different reasons. The window can be opened e.g. via the remote control, via a switch in the door on the driver's side or via a switch in the respective rear door.

The opening process via the remote control is initiated e.g. by means of the master 1 (e.g. central locking system 32), and the opening process via the switches is initiated e.g. by the master 2 (e.g. door control device 34). When a function request is issued, there is selectively awakened e.g. one of two functional groups A and B, i.e. a group of bus participants. It is to be noted in this regard that the functional groups A and B are physically connected to the same bus (in this case, to said "combinatory CAN" 18).

In both of the above cases, the rear window will be opened.

In both cases, however, the wakeup reason must be known so that, subsequently, the fitting program sequence can be guaranteed locally in the window lifter control device. If, for instance, the request came from the central locking system 32 and the automobile has not been occupied by any person for a certain period of time, the central locking system 32 will lock the car again.

The wakeup request can be set with the aid of the CAN ID, notably by a masking which could be provided as follows:

Awakening the functional group A by master 1: 1xxx
Awakening the functional group A by master 2: 2xxx
Awakening the functional group B by master 1: 3xxx
Awakening the functional group B by master 2: 4xxx In this manner, the awakened control device is informed of the origin of the wakeup pulse. ID data (contents) between 1,000 and 1,999 originate from master 1 and will address the functional group A, while ID data (contents) between 2,000 and 2,999 originate from master 2 and will address the functional group B. Further, in this example, ID data (contents) between 3,000 and 3,999 originate from master 1 and will address the functional group B, while ID data (contents) between 4,000 and 4,999 originate from master 2 and will address the functional group B.

The above outlined operation also makes it possible to combine a plurality of physical bus systems into one system, thus allowing for cost reduction.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

This application claims priority of European Patent Application No. 10174301.1 filed on Aug. 27, 2010, which is hereby incorporated herein by reference.

The invention claimed is:

1. A method for the switching of participants of a bus system from a first state with reduced energy consumption to a second state with increased energy consumption relative to the first state, wherein, for communication between the participants of the bus system, data frames are transmitted which comprise a message identification field and a useful-data field, wherein, according to said method
    each participant, for switching from the first state to the second state, reacts on data frames with respective predetermined data contents in the message identification field as well as in the useful-data field, and
    in the bus system, for selective switching of a participant from the first state to the second state, those data frames are transmitted on whose message-identification-field contents and useful data-field-contents the selectively addressable participant reacts.

2. The method according to claim 1, wherein the bus system is a controller area network (CAN) bus system and the predetermined data contents have been stored in a CAN identification (ID) field and a CAN payload field of a CAN data frame.

3. The method according to claim 1, wherein the bus system comprises a local interconnect network (LIN) or FlexRay network.

4. The method according to claim 1, wherein a plurality of participants of the bus system react on the same predetermined data contents in the message identification field and on different, respectively predetermined data contents in the useful-data field.

5. The method according to claim 1, wherein a plurality of participants react on different, respectively predetermined data contents in the message identification field and on different, respectively predetermined data contents in the useful-data field.

6. The method according to claim 1, wherein a plurality of participants react on different, respectively predetermined data contents in the message identification field and on the same predetermined data contents in the useful-data field.

* * * * *